US006754447B2

(12) United States Patent
Lee et al.

(10) Patent No.: US 6,754,447 B2
(45) Date of Patent: Jun. 22, 2004

(54) FLASH CONTROLLING APPARATUS UTILIZING CHARACTERISTICS OF A LOGARITHMIC FUNCTION

(75) Inventors: Seok-goun Lee, Seongsnam-si (KR); Hyeon-woo Jeong, Changwon-si (KR); Byung-deok Nam, Seoul (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 10/631,593

(22) Filed: Jul. 31, 2003

(65) Prior Publication Data

US 2004/0057716 A1 Mar. 25, 2004

(30) Foreign Application Priority Data

Aug. 16, 2002 (KR) ................................ 10-2002-0048393

(51) Int. Cl.[7] ................................................ G03B 15/05
(52) U.S. Cl. ...................................................... 396/159
(58) Field of Search .......................... 396/159; 315/151, 315/241 P

(56) References Cited

U.S. PATENT DOCUMENTS 6,085,040 A * 7/2000 Yasukawa .................... 396/61

* cited by examiner

*Primary Examiner*—W. B. Perkey
(74) *Attorney, Agent, or Firm*—St. Onge Steward Johnston & Reens LLC

(57) ABSTRACT

A flash controlling apparatus is provided including a light receiving unit PS, a current-to-voltage converter IVC, a comparator CR, and a micro-controller MC. The light receiving unit PS generates a current signal corresponding to the flash intensity of a camera. The current-to-voltage converter IVC converts the current signal received from the light receiving unit PS into a voltage signal $S_{PS}$. The comparator CR compares the voltage signal $S_{PS}$ with a reference voltage $V_{REF}$ to obtain a resultant logic signal $S_{COM}$. The micro-controller MC controls the operation of the current-to-voltage converter IVC and controls the operation of a flash device of the camera according to the resultant logic signal $S_{COM}$ received from the comparator CR. The voltage signal $S_{PS}$ from the current-to-voltage converter IVC has the characteristics of a logarithmic function with respect to time.

5 Claims, 6 Drawing Sheets

FLASH CONTROLLING APPARATUS UTILIZING CHARACTERISTICS OF A LOGARITHMIC FUNCTION

CROSS-REFERENCES TO RELATED APPLICATIONS

This application claims priority from Korean Patent Application No. 2002-48393 filed on Aug. 16, 2002, in the Korean Intellectual Property Office, the disclosure of which is incorporated herein in its entirety by reference.

BACKGROUND OF THE INVENTION

1. Field of the Invention

The present invention relates to a flash controlling apparatus, and more particularly, to an apparatus for controlling the operation of a flash device of a camera.

2. Description of the Related Art

It has been proposed to implement a flash controlling apparatus for a camera having a control voltage generator which produces a control voltage that increases linearly with time, so that the flash is terminated when the linearly increasing control voltage crosses a reference voltage threshold. However, such an apparatus would emit too much light if the distance between an object OB and the camera is short and/or if an ambient illumination intensity is high, if it is designed to emit an appropriate amount of light when the distance between an object OB and the camera is long and/or if an ambient illumination intensity is low. In other words, referring to FIG. 1, due to the linear characteristics of the control voltage $S_{PS}$ over time, a light emitting time $T_S$ (produced for short distances and/or high ambient light) is longer than it ought to be when a light emitting time $T_L$ (produced for long distances and/or low ambient light) is appropriate. To solve this problem, if the inclinations of an $S_{PPS}$ characteristic line for near objects or relatively high ambient light levels and an $S_{PSL}$ characteristic line for far objects or relatively low ambient light levels are increased, the light emitting time $T_L$ is shorter than required, although the light emitting time $T_S$ is then appropriate. Consequently, in the proposed flash controlling apparatus, the amount of light emitted from the flash device cannot be appropriately controlled according to the distance between the object and the camera and the intensity of the ambient illumination.

SUMMARY OF THE INVENTION

The present invention provides a flash controlling apparatus which can more uniformly control the amount of flash light emission regardless of the distance between an object and a camera and the intensity of an ambient illumination.

According to an aspect of the present invention, there is provided a flash controlling apparatus including a light receiving unit PS, a current-to-voltage converter IVC, a comparator CR, and a micro-controller MC. The light receiving unit PS generates a current signal corresponding to the flash intensity of a camera. The current-to-voltage converter IVC converts the current signal received from the light receiving unit PS into a voltage signal $S_{PS}$. The comparator CR compares the voltage signal $S_{PS}$ with a reference voltage $V_{REF}$ to obtain a resultant logic signal $S_{COM}$. The micro-controller MC controls the operation of the current-to-voltage converter IVC and controls the operation of a flash device of the camera according to the resultant logic signal $S_{COM}$ received from the comparator CR. The voltage signal $S_{PS}$ from the current-to-voltage converter IVC has the characteristics of a logarithmic function with respect to time.

In the flash controlling apparatus according to the present invention, since the voltage signal $S_{PS}$ from the current-to-voltage converter IVC has the characteristics of a logarithmic function with respect to time, the light-emitting time $T_S$ when an object is close to a camera and/or when an ambient illumination is high can be reduced relative to that of a conventional flash controlling apparatus while the light-emitting time $T_L$ when an object is far from a camera and/or when an ambient illumination is low can be made similar to that of the conventional flash controlling apparatus. Accordingly, the amount of light emitted from the flash device can be more appropriately controlled according to the distance between an object and a camera and the intensity of an ambient illumination.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE DRAWINGS

Figure 2:
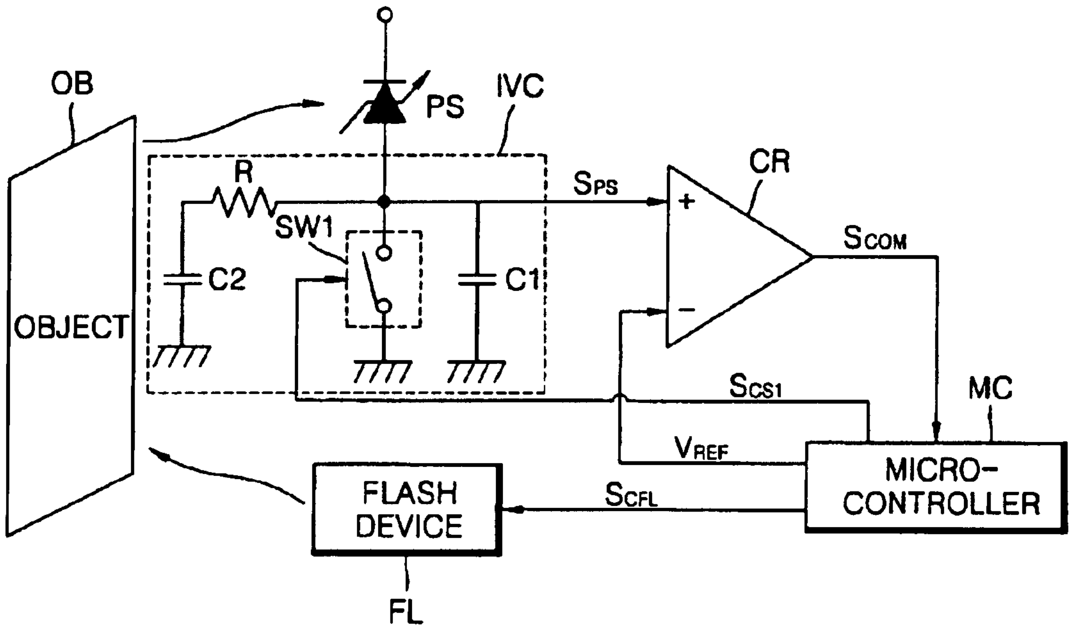
FIG. 2 is a circuit diagram of the internal structure of a flash controlling apparatus according to a first embodiment of the present invention.

Referring to FIG. 2, a flash controlling apparatus according to a first embodiment of the present invention includes a light receiving unit PS, a current-to-voltage converter IVC, a comparator CR, and a micro-controller MC.

The light receiving unit PS generates a current signal corresponding to the flash intensity of the camera by converting light energy received from an object OB into electric energy. The current-to-voltage converter IVC converts the current signal received from the light receiving unit PS into a voltage signal $S_{PS}$. The comparator CR compares the voltage signal $S_{PS}$ with a reference voltage $V_{REF}$ to obtain a resultant logic signal $S_{COM}$. The micro-controller MC controls the operation of the current-to-voltage converter IVC to obtain a signal $S_{CF}$ which controls the operation of the flash device FL according to the resultant logic signal $S_{COM}$ received from the comparator CR.

The current-to-voltage converter IVC includes first and second capacitors C1 and C2, a resistor R, and a reset switch SW1. The capacitor C1 is connected between an output terminal of the light receiving unit PS, which is connected to a signal input terminal (+) of the comparator CR, and a ground terminal. One end of the resistor R is connected to the output terminal of the light receiving unit PS. The second capacitor C2 having larger capacitance than the first capacitor C1 is connected between the other end of the resistor R and the ground terminal. The reset switch SW1 connected in parallel to the first capacitor C1 is driven by a reset control signal $S_{CS1}$ received from the micro-controller MC, and is turned on after the light emitting operation of the flash device FL is completed, thereby discharging the first capacitor C1.

Figure 3A:
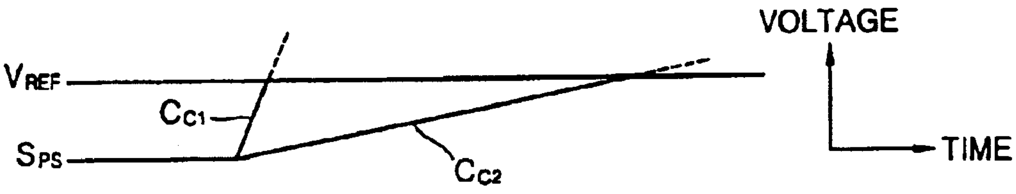
FIG. 3A is a waveform diagram showing signal characteristics produced by the individual operations of the first and second capacitors of the flash controlling apparatus of FIG. 2.

FIG. 3A shows the signal characteristics produced by the individual operations of the first and second capacitors C1 and C2 of the flash controlling apparatus of FIG. 2. In FIG. 3A, reference character $V_{REF}$ denotes a reference voltage applied from the micro-controller MC to the comparator CR. Reference character $S_{PS}$ denotes a voltage signal applied from the current-to-voltage converter IVC to the comparator CR. Reference character $C_{C1}$ denotes a voltage signal that would be obtained if only the first capacitor C1 were charged in the absence of R and C2, and reference character $C_{C2}$ denotes a voltage signal that would be obtained if only the second capacitor C2 were charged in the absence of R and C1. Referring to FIGS. 2 and 3A, since the first capacitor C1 has lower capacitance than the second capacitor C2, the first capacitor C1 has a $C_{C1}$ characteristic line with a high inclination. If the resistor R were omitted from the circuit, a composite signal of the voltage signal $C_{C1}$ generated by the first capacitor C1 and the voltage signal $C_{C2}$ generated by the second capacitor C2 is applied from the current-to-voltage converter IVC to the comparator CR.

Figure 3B:
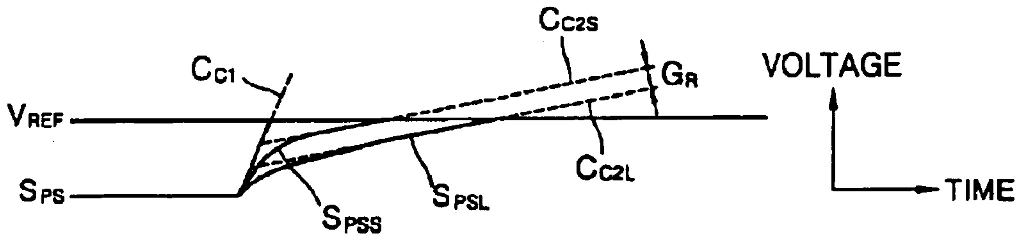
FIG. 3B is a waveform diagram showing signal characteristics produced by the combined operation of the first and second capacitors of the flash controlling apparatus of FIG. 2.

FIG. 3B shows signal characteristics generated by a composite operation performed by the resistor R and the first and second capacitors C1 and C2 in the flash controlling apparatus of FIG. 2. The same reference characters of FIG. 3B as those of FIG. 3A denote the same elements. In FIG. 3B, reference character $S_{PSS}$ denotes a voltage signal generated by the second capacitor C2 if the resistor R has relatively low resistance. Reference character $S_{PSL}$ denotes a voltage signal generated by the second capacitor C2 if the resistor R has relatively high resistance. In other words, the difference GR between the levels of two signals $C_{C2S}$ and $C_{C2L}$ is determined by the resistance value of the resistor R.

Accordingly, when the resistor R has relatively low resistance, the voltage signal $S_{PSS}$, which is a composite signal of the signals $C_{C1}$ and $C_{C2S}$, has the characteristics of a logarithmic function and is applied from the current-to-voltage converter IVC to the comparator CR. When the resistor R has a relatively high resistance, the voltage signal $S_{PSL}$, which is a composite signal of the signals $C_{C1}$ and $C_{C2L}$, has the characteristics of a logarithmic function and is applied from the current-to-voltage converter IVC to the comparator CR.

Figure 1:
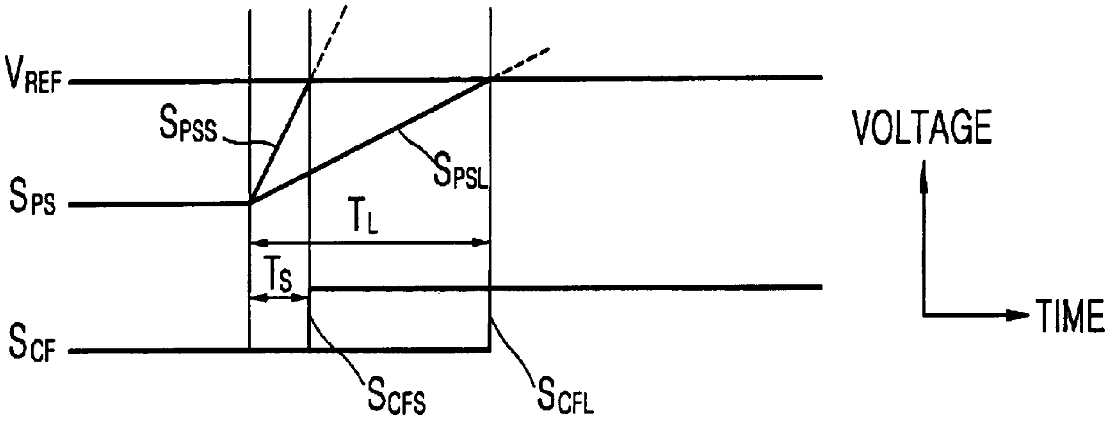
FIG. 1 RELATED ART
FIG. 1 is a waveform diagram showing signal characteristics of a conventional flash controlling apparatus.
Figure 3C:
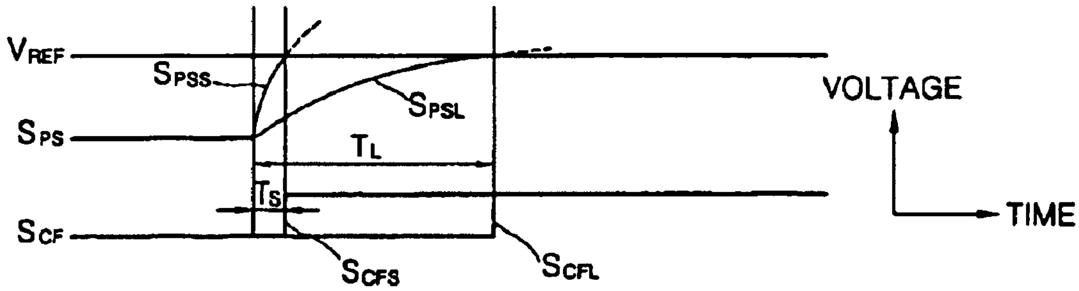
FIG. 3C is a waveform diagram showing all of the signal characteristics of the flash controlling apparatus of FIG. 2.

FIG. 3C shows all of the signal characteristics of the flash controlling apparatus of FIG. 2. The same reference characters of FIG. 3C as those of FIG. 1 denote the same elements. When FIG. 3C is compared with FIG. 1, it can be understood that a flash controlling apparatus according to the present invention has the following effects. Since the voltage signal $S_{PS}$ from the current-to-voltage converter IVC has the characteristics of a logarithmic function with respect to time, the light emitting time $T_S$ of FIG. 4C when an object is relatively close to a camera and/or when an ambient illumination is high is shorter than that of FIG. 1. However, the light emitting time $T_L$ of FIG. 3C when an object is relatively far from a camera and/or when an ambient illumination is similar to that of FIG. 1. Hence, the amount of light emitted from a flash device can be more uniformly controlled according to the distance between an object and a camera and the intensity of an ambient illumination by means of the apparatus of FIG. 2.

Figure 4:
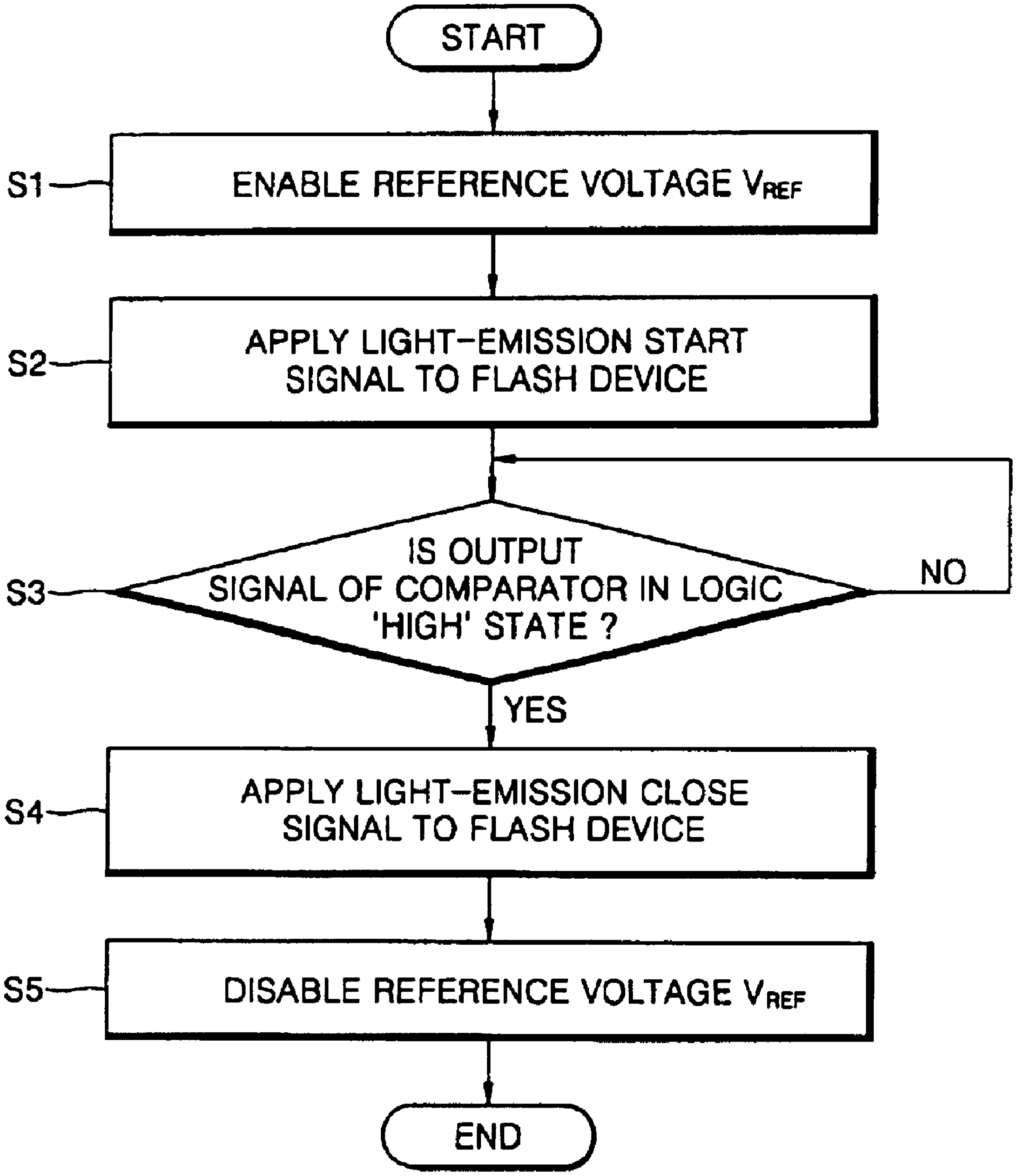
FIG. 4 is a flowchart for illustrating an algorithm performed by a micro-controller of the flash controlling apparatus of FIG. 2.

An algorithm performed in the micro-controller MC of the flash controlling apparatus of FIG. 2 will now be described with reference to FIGS. 2 and 4. First, in step S1, a reference voltage $V_{REF}$ is enabled in response to a light flash command issued by a user. Accordingly, the reference voltage $V_{REF}$ is input to a '+' input terminal of the comparator CR. Thereafter, in step S2, a light-emission start signal is applied to the flash device FL. Accordingly, the flash device FL emits light. Next, when the output signal $S_{COM}$ of the comparator CR switches to a logic 'high' state in step S3, a light-emission close signal is applied to the flash device FL, in step S4. Accordingly, the flash device FL concludes the light emission. In step S5, the reference voltage $V_{REF}$ applied to the comparator CR is disabled.

Figure 5:
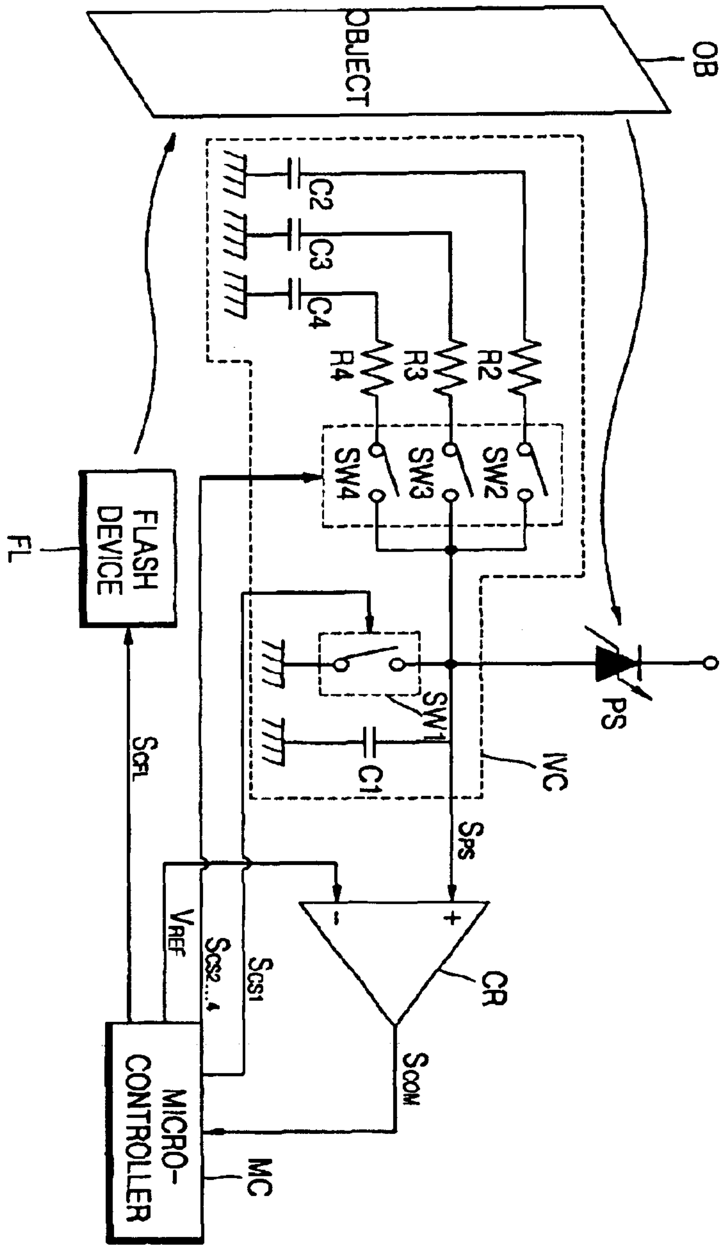
FIG. 5 is a circuit diagram of the internal structure of a flash controlling apparatus according to a second embodiment of the present invention.
Figure 6:
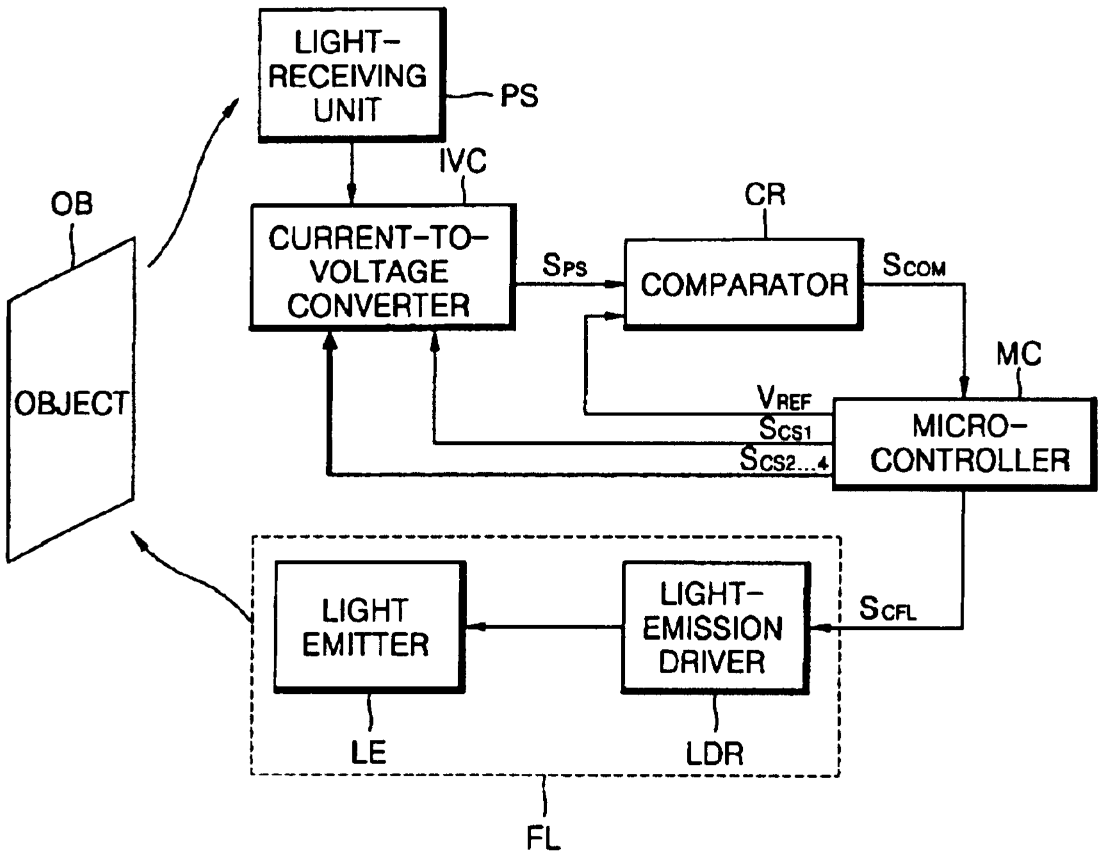
FIG. 6 is a block diagram of the internal structure of the flash controlling apparatus of FIG. 5.

Referring to FIGS. 5 and 6, a flash controlling apparatus according to a second embodiment of the present invention includes a light receiving unit PS, a current-to-voltage converter IVC, a comparator CR, and a micro-controller MC. While FIG. 5 illustrates the details of the current voltage converter IVC of FIG. 6, FIG. 6 provides certain details of the flash device FL of FIG. 5.

The light receiving unit PS generates a current signal corresponding to the flash intensity of the camera by converting light energy received from an object OB into electric energy. The current-to-voltage converter IVC converts the current signal received from the light receiving unit PS into a voltage signal $S_{PS}$. The comparator CR compares the voltage signal $S_{PS}$ with a reference voltage $V_{REF}$ to obtain a resultant logic signal $S_{COM}$. The micro-controller MC controls the operation of the current-to-voltage converter IVC to obtain a signal $S_{CFL}$ which controls the operation of the flash device FL according to the resultant logic signal $S_{COM}$ received from the comparator CR. More specifically, with reference to FIG. 6, the logic signal $S_{COM}$ controls a light emission driver LDR to energize a light emitter LE to emit light.

The current-to-voltage converter IVC includes a first capacitor C1, a plurality of switches SW2, SW3, and SW4, a plurality of resistors R2, R3, and R4, and a plurality of capacitors C2, C3, and C4. The first capacitor C1 is connected between an output terminal of the light receiving unit PS, which is connected to a signal input terminal of the comparator CR, and a ground terminal. One end of each of the switches SW2, SW3, and SW4 is connected to the output terminal of the light receiving unit PS. One end of each of the resistors R2, R3, and R4 is connected to the other end of a respective one of the switches SW2, SW3, and SW4. The capacitors C2, C3, and C4 are connected between the resistor R2 and a ground terminal, between the resistor R3 and the ground terminal, and between the resistor R4 and the ground terminal, respectively. The switches SW2, SW3, and SW4 are selectively driven by the micro-controller MC. A reset switch SW1, which is connected in parallel to the first capacitor C1, is driven by a reset control signal $S_{CS1}$ received from the micro-controller MC, and is turned on after the light emitting operation of the flash device FL is completed, thereby completely removing charges from the first capacitor C1.

The principle of the operation of the flash controlling apparatus of FIGS. 5 and 6 are the same as the above-described operation principle of the flash controlling apparatus of FIG. 2. In contrast with the flash controlling apparatus of FIG. 2, in the flash controlling apparatus of FIG. 5, the resistors R2, R3, and R4 and the capacitors C2, C3, and C4 are selectively turned on by the switches SW2, SW3, and SW4 so that the capacitance and resistance to be used are easily set.

As described above, in a flash controlling apparatus according to the present invention, the voltage signal $S_{PS}$ from the current-to-voltage converter IVC has the characteristics of a logarithmic function with respect to time. Hence, the light-emitting time $T_S$ when an object is close to a camera and/or when an ambient illumination is high is reduced as compared to that of a conventional flash controlling apparatus. On the other hand, the light-emitting time $T_L$ when an object is far from a camera and/or when an ambient illumination is low is similar to that of the conventional flash controlling apparatus. Accordingly, the amount of light emitted from a flash device can be more uniformly controlled regardless of the distance between an object and a camera and the intensity of an ambient illumination.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A flash controlling apparatus comprising:

a light receiving unit which generates a current signal corresponding to a flash intensity of a light flash emitted by a flash device of a camera;

a current-to-voltage converter coupled with the light receiving unit to receive the current signal and which is operative to convert the current signal into a voltage signal;

a comparator coupled with the current-to-voltage converter and which is operative to compare the voltage signal with a reference voltage to obtain a resultant logic signal; and, a micro-controller coupled with the current-to-voltage converter and with the flash device of the camera and which controls the operation of the current-to-voltage converter and which is operative to control the operation of the flash device of the camera according to the resultant logic signal, wherein the voltage signal from the current-to-voltage converter has the characteristics of a logarithmic function with respect to time.

2. The flash controlling apparatus of claim 1, wherein the current-to-voltage converter comprises:

a first capacitor having a first terminal coupled with an output of the light receiving unit, and a second terminal coupled with a ground terminal, the first terminal of the first capacitor being coupled with a signal input of the comparator;

a resistor having a first terminal coupled with the output of the light receiving unit, and a second terminal; and a second capacitor having a first terminal coupled with the second terminal of the resistor and a second terminal with the ground terminal.

3. The flash controlling apparatus of claim 2, wherein the second capacitor has a capacitance which is greater than a capacitance of the first capacitor.

4. The flash controlling apparatus of claim 1, wherein the current-to-voltage converter comprises:

a first capacitor having a first terminal coupled with an output of the light receiving unit, and a second terminal coupled with a ground terminal, the first terminal of the first capacitor being coupled with a signal input of the comparator;

a plurality of switches, each having a first terminal coupled with the output of the light receiving unit and a second terminal;

a plurality of resistors, each having a first terminal coupled with the second terminal of a respective one of the switches and a second terminal; and a plurality of capacitors, each having a first terminal coupled with the second terminal of a respective one of the resistors and a second terminal coupled with the ground terminal.

5. The flash controlling apparatus of claim 4, wherein the micro-controller is operative to selectively switch the plurality of the switches.

* * * * *